DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 3, 1973

909 O.G. 6

T909,006

SOLUTION POLYMERIZATION

Glen Alliger, Akron, Ohio, assignor to The Firestone Tire & Rubber Company, Akron, Ohio

Continuation of application Ser. No. 55,868, July 17, 1970. This application May 22, 1972, Ser. No. 255,911

Int. Cl. C08d *7/02, 9/00*

U.S. Cl. 260—5

1 Sheet Drawing. 7 Pages Specification

The vulcanization of mixtures of polymer latices with solution-polymerized polymers such as (1) homopolymers and copolymers of conjugated dienes of 4 or 5 carbon atoms, (2) copolymers of such a conjugated diene and a vinyl monomer, and (3) blends thereof, is accelerated by 2-benzothiazyl-N,N-dialkyl thiocarbamyl sulfide in which the alkyl groups contain 1 to 20 carbon atoms, the mixture being compounded with ingredients including carbon black and sulfur, and then de-solventizing, dewatering and drying, and then vulcanizing.

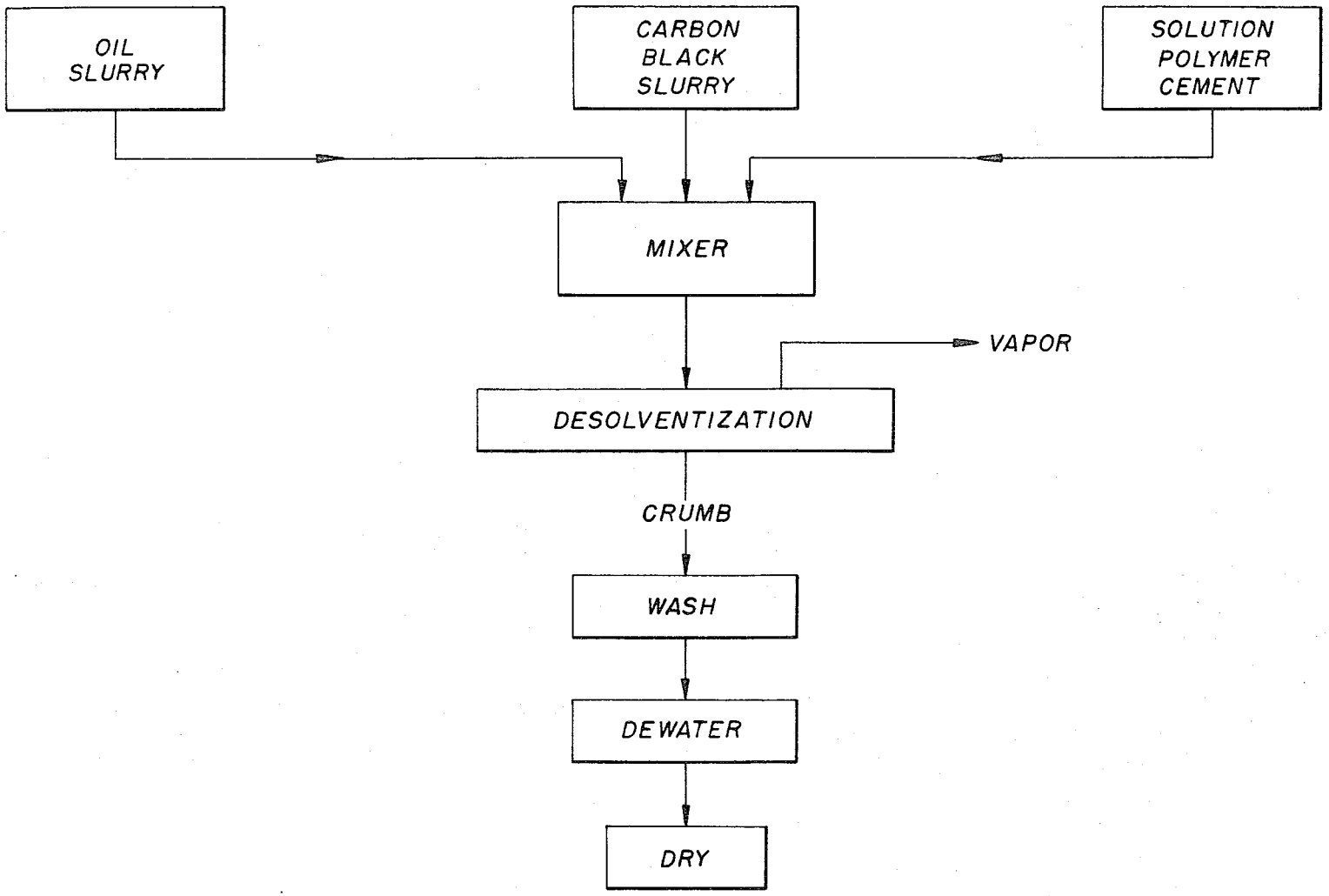

SOLUTION POLYMERIZATION
Original Filed July 17, 1970